Patented Dec. 4, 1923.

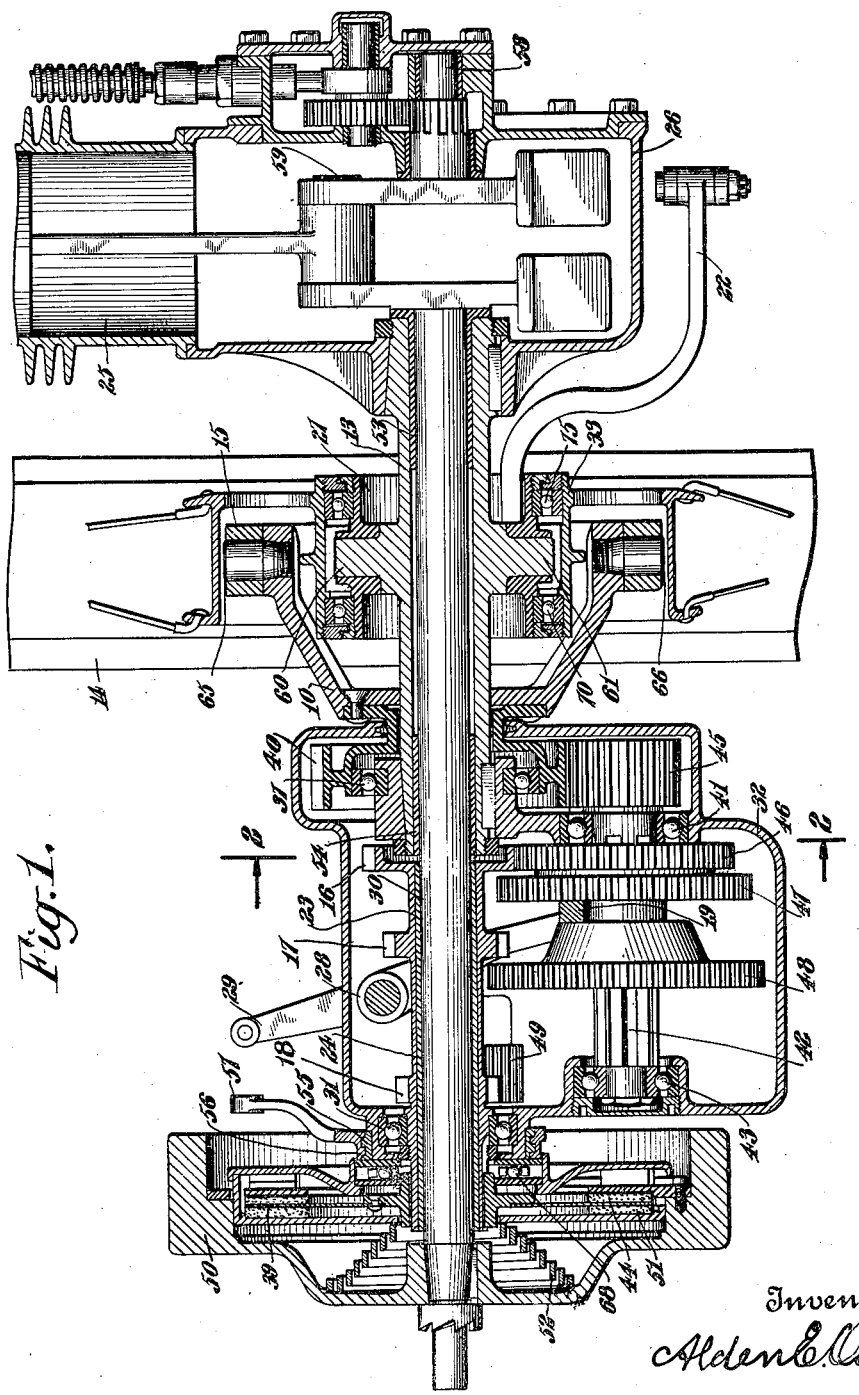

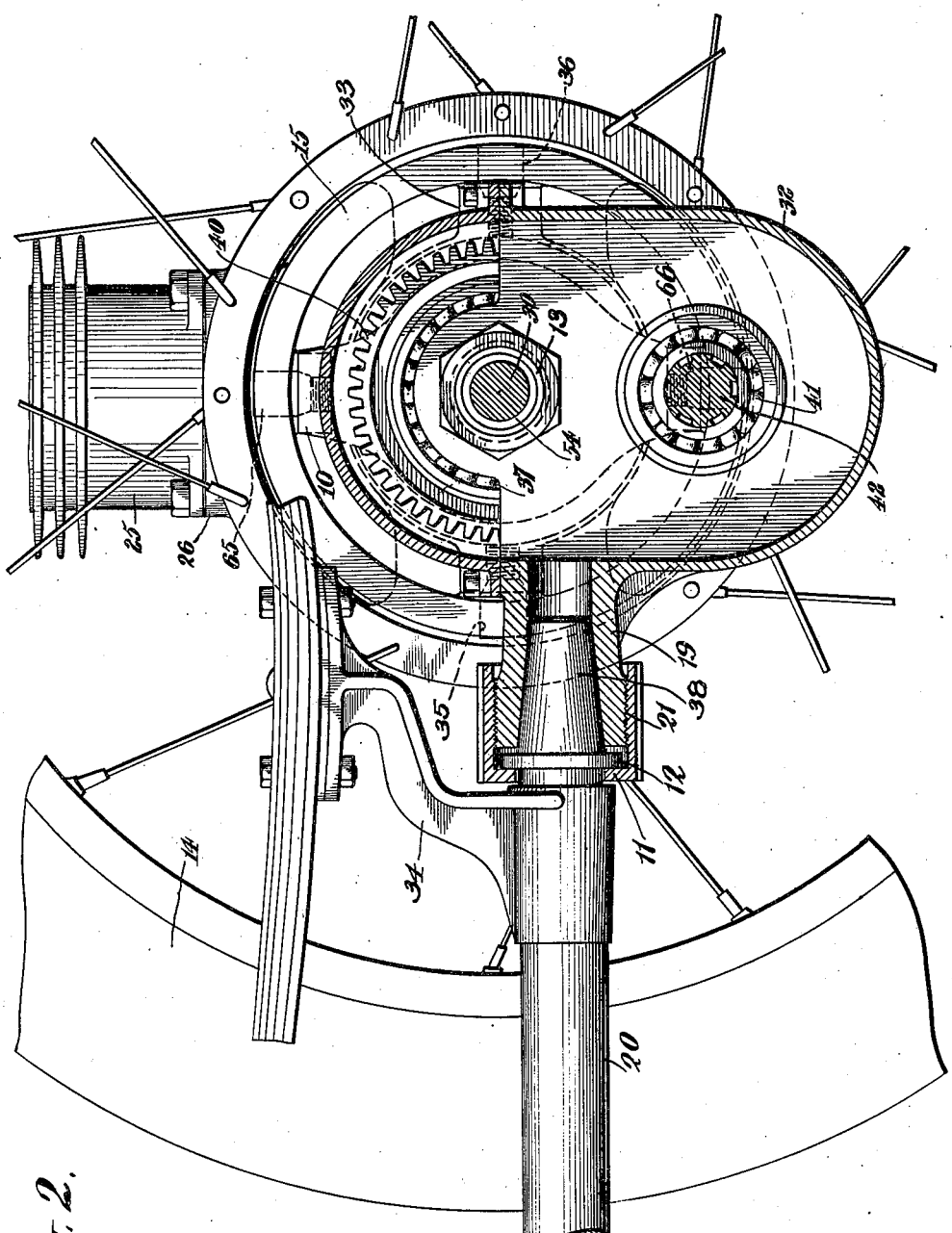

1,476,173

UNITED STATES PATENT OFFICE.

ALDEN E. OSBORN, OF NEW YORK, N. Y.

STEERING-WHEEL DRIVING MECHANISM.

Application filed April 4, 1921, Serial No. 458,492. Renewed February 27, 1923.

*To all whom it may concern:*

Be it known that I, ALDEN E. OSBORN, a citizen of the United States of America, and a resident of New York, county of the Bronx, and State of New York, have invented certain new and useful Improvements in a Steering-Wheel Driving Mechanism, of which the following is a specification.

This invention relates particularly to improvements in motor vehicle of the type in which a single combined traction and steering wheel is employed, which wheel is rotatably mounted on a wheel support that is pivotally mounted on the axle within the hub of the wheel. It is distinguished especially from other devices because of the fact that the main driving shaft, which is connected to the vehicle propelling motor, is within the wheel support and does not move therewith when sluing the wheel for steering while yet the power of the motor is transmitted from said shaft to the wheel by a suitable universal joint mechanism. By passing the main driving shaft thru the wheel support the weight of the motor or engine, which may be mounted at one side of the wheel and directly connected to the shaft, can be counterbalanced by the weight of the speed change gear and flywheel which may be mounted at the other side of the wheel thus eliminating the strain on the parts that would occur if a heavy weight were carried at one side of the wheel only. My invention also provides a simple and rigid method of attaching the aforesaid axle to the vehicle framing.

In the accompanying drawings I have, for the purposes of disclosure, illustrated my invention in one form only but I would have it understood that it is susceptible of embodiment in other forms without departure from the true spirit and scope of the invention as defined in the appended claims. In these drawings:

Figure 1 represents a partial sectional elevation of my invention taken on the center line of the wheel axle, and Figure 2 represents a partial sectional side elevation of Fig. 1 taken approximately on the line 2—2 of Fig. 1.

Similar numerals of reference indicate similar parts in both figures.

Referring to Fig. 1 it will be noticed that the propelling motor or engine 25 is shown as at one side of the wheel 14 and directly connected with the main shaft 30 which is shown as concentric with the axis thereof. While I prefer to have the motor mounted in this position it may obviously be mounted on any other convenient part of the vehicle and connected to the main shaft by chains or gearing. The construction of this motor or engine is not material to my invention, however, I have shown it as of the four-cycle internal combustion type acting directly on a crank pin 59 fastened to the main shaft 30 and having an extension shaft 58, designed to operate the engine valves and carry a balance weight, connected to the crank pin and revolvable about the same axis as the main shaft. The main shaft 30 is carried by bearings 53 and 54 in the axle 13 and passes thru the axle so that the power transmission gearing or other desired parts may be connected thereto at the opposite side of the wheel from the motor 25. The axle 12 is provided with two vertical pivot studs 60 and 61 about which the wheel support 27 turns when slued for steering by the lever 22. The studs 60 and 61 are shown as integral with the axle 13 and the support 27 is placed about them by being made in two longitudinally separable parts as set forth in my patent for a steering wheel driving mechanism, No. 1,182,928, dated May 16, 1916, altho the studs may be made separable from the axle so that the support can be in one piece and put in place if desired. The support 27 carries the bearings 70 and 75 for the wheel hub 33 about which hub is arranged the universal joint ring 15 which ring is pivotally joined to the hub at opposite points (see Fig. 2) and is pivotally joined, at opposite points and on a line at right angles to the line of its pivotal connections to the hub, to the projecting arms of the driving member 10 which revolves about the axle 13 and is carried by the bearing 37 that engages the gear 40 which is rigidly attached to this member 10. This gear 40 is enclosed within the gear case 32 and meshes with the pinion 45 on the intermediate shaft 42 of the transmission system which is carried by the bearings 41 and 43 in the case 32 and has the longitudinally slidable gears 46, 47 and 48 of the speed change gearing mounted on it. These gears are adapted to mesh with the gears 16, 17 and 18 on the sleeve 23 when they are moved to the proper position by means of the collar 19 and levers 28 and 29. The gear 48 is also arranged, when in the proper position, to mesh with an intermediate pinion 49 that is, I prefer, mounted on an eccentric bushing or shaft (like the back gearing of a lathe) so that it can be thrown into mesh between this gear 48 and the sleeve gear 18 and give a reverse motion upon engaging the clutch. The details and operation of this form of speed change gearing are too well known to require further description. The sleeve 23 has a bearing 24 about the shaft 30 and a supporting bearing 31 in the case 32 and extends outside of this latter bearing and has the driven disc 39 (or discs if a multiple disc clutch is used) keyed on its end. While any type of clutch may be employed I have shown a form similar to that which is shown in my patent on a motor vehicle No. 1,421,545 dated July 4, 1922, in which the driven disc 39 is, when the clutch is engaged, pressed between the friction surfaces 44 and 51 by the spring 52 that bears against the flywheel 50. The clutch is disengaged thru the action of the rotation, by the lever 57, of the internally threaded collar 56 on the externally threaded sleeve 55 which causes the longitudinal movement of this collar 56 and, thru the thrust bearing 68, the clutch parts separates the clutch discs against the action of the spring 52. It should be clearly understood that my invention is not in any way limited to use in connection with the form of transmission mechanism herein shown and that other devices for obtaining the various changes of speed between the propelling motor and wheel can be employed or that that main shaft may be connected to the wheel by gearing giving a fixed ratio only as would be desirable if an electric motor were used. In this case the gears 16, 46, 40 and 45 would be the only ones needed and the gear 16 would be fastened to the main shaft 30 so that the friction clutch would be unnecessary and the fly wheel 50 (which would be made very light) could be employed as a brake drum if desired. It will be noticed that the axle 13 is shown as rigidly fastened into the engine crank case 26 at one end and into the gear case 32 at the other end as these cases perform a part in the connection of the axle to the framing of the vehicle. In order to explain this clearly, as well as the pivoting of the universal joint ring reference should now be made to Fig. 2. In this figure a section thru the gear case 32 parallel with the line of the frame member 20 is shown so that the preferred form of connection between the frame and the casings (the same form of connection can be used on the crank case side) will be understood. This connection consists of a suitable boss 19 on the case 32 having a thread 21 on its outside, a tapered end 38 on the frame member 20 and a nut 11 engaging with the collar 12 on the frame member 20 and with the thread 21 on the boss so that the tapered end on the frame member can be drawn forcibly into the socket in the casing by turning the nut or forced out of the socket by turning the nut the other way as it then acts against the face of the spring bracket 34. The universal joint ring 15 (shown in this figure partly by dotted lines) is pivoted at 35 and 36 on the wheel hub 33 and at 65 and 66 on the driving member 10 so that it allows of the free sluing of the wheel 14 without interfering with the transmission of power thereto.

Having thus described my invention, I claim as new and desire to secure by Letters Patent—

1. In a motor vehicle the combination of a traction wheel, a support for said wheel about which said wheel can rotate, an axle on which said support is pivotally mounted, a driven gear rotatable about said axle and having driving connection with said traction wheel, and a casing enclosing said gear and attached to the end of the axle passing thru said gear and forming a connecting member between the axle and the main part of the vehicle.

2. In a motor vehicle the combination of a traction wheel, a support for said wheel about which said wheel can rotate, an axle on which said support is pivotally mounted, a power transmitting shaft passing thru the support, a driving member rotatable about said axle, means for connecting said shaft to said driving member to rotate said member at a lower speed than the shaft, and means for transmitting the rotation of the driving member to the wheel embodying a universal joint adjacent to the wheel.

3. In a motor vehicle the combination of a traction wheel, a support for said wheel about which said wheel can rotate, an axle on which said support is pivotally mounted, a power transmitting shaft passing thru the support, a driving member rotatable about said axle, means for connecting said shaft to said driving member to rotate said member, and a universal joint between said driving member and said traction wheel to transmit the rotation of the driving member to the wheel.

4. In a motor vehicle the combination of a traction wheel, a support for said wheel about which said wheel can rotate, an axle on which said support is pivotally mounted, a power transmitting shaft passing thru said support, a driving member rotatable about said shaft and said axle, a rotatably mounted counter shaft, controllable means for transmitting the rotation of the power transmitting shaft to the counter shaft at different speeds, a gear on the driving member, a gear on the counter shaft and meshing with this gear on the driving member, and means for transmitting the rotation of the driving member to the wheel.

5. In a motor vehicle the combination of a traction wheel, a support for said wheel about which said wheel can rotate, an axle on which said support is pivotally mounted, a power transmitting shaft passing thru said support, a driving member rotatable about said shaft and said axle, a gear on the power transmitting shaft, means for transmitting the rotation of said gear to said driving member, means for transmitting the rotation of the driving member to the wheel, and controllable means for releasing the gear on the power transmitting shaft from turning with the shaft or for locking said gear to the shaft.

6. In a motor vehicle the combination of a traction wheel, a support for said wheel about which said wheel can rotate, an axle on which said support is pivotally mounted, a power transmitting shaft passing thru the axle, a driving member rotatable about the axle, means for connecting said shaft to said driving member to rotate said driving member from said shaft, and means for transmitting the rotation of the driving member to the wheel.

7. In a motor vehicle the combination of a traction wheel, a support for said wheel about which said wheel can rotate, an axle on which said support is pivotally mounted, a power transmitting shaft passing thru the axle, a propelling motor connected to said power transmitting shaft at one side of the wheel support, a driving member rotatable about the axle and on the opposite side of the wheel support from the said motor connection to the power transmitting shaft, means for connecting this power transmitting shaft to the driving member to rotate said driving member from said shaft, and means for transmitting the rotation of the driving member to the wheel.

In witness whereof, I have hereto set my hand this 1st day of April, 1921.

ALDEN E. OSBORN.